United States Patent
Sahasrabudhe et al.

(10) Patent No.: US 12,346,593 B1
(45) Date of Patent: Jul. 1, 2025

(54) GLOBAL MEMORY SEGMENTATION CONVERSION

(71) Applicant: Dell Products, L.P., Hopkinton, MA (US)

(72) Inventors: Kaustubh Sahasrabudhe, Westborough, MA (US); Ramesh Doddaiah, Westborough, MA (US); Malak Alshawabkeh, Franklin, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/402,868

(22) Filed: Jan. 3, 2024

(51) Int. Cl.
   *G06F 3/06* (2006.01)

(52) U.S. Cl.
   CPC ............. *G06F 3/065* (2013.01); *G06F 3/061* (2013.01); *G06F 3/0616* (2013.01); *G06F 3/0679* (2013.01)

(58) Field of Classification Search
   CPC ........ G06F 3/065; G06F 3/061; G06F 3/0616; G06F 3/0679
   See application file for complete search history.

(56) References Cited

U.S. PATENT DOCUMENTS

| | | | |
|---|---|---|---|
| 11,842,085 B1 * | 12/2023 | Sreekanthan | G06F 3/064 |
| 2011/0078367 A1 * | 3/2011 | Minkin | G06F 12/084 711/170 |
| 2012/0054734 A1 * | 3/2012 | Andrews | G06F 8/65 717/171 |
| 2017/0277638 A1 * | 9/2017 | Busayarat | G06F 12/0864 |
| 2020/0133843 A1 * | 4/2020 | Muchherla | G06F 12/0246 |
| 2021/0173782 A1 * | 6/2021 | Krasner | G06F 12/0223 |

* cited by examiner

*Primary Examiner* — Nanci N Wong
(74) *Attorney, Agent, or Firm* — Anderson Gorecki LLP

(57) ABSTRACT

A shared global memory segmentation conversion process optimizes conversion of shared Global Memory (GM) in connection with changes to a global memory segmentation policy. When a policy region is to be reduced in size, the GM banks of the policy region are ranked and one or more of the lowest performing GM banks in the policy region are selected to be moved to the other policy region. Similarly, within each policy region, IO pools, used to create slots of particular sizes, that are being reduced in size are determined, and the GM banks of the IO pools are ranked. One or more of the lowest performing GM banks are selected and moved to an IO pool that is being increased in size. This process iterates, re-ranking the remaining GM banks in the policy region/IO pools, until the correct allocation of GM policy regions and IO pools is achieved.

20 Claims, 8 Drawing Sheets

Mirrored (Write) Policy Region 210

| | | |
|---|---|---|
| Global Memory Bank $240_1$ | Fall Through Time $305_1$ | Ageing $310_1$ |
| Global Memory Bank $240_2$ | Fall Through Time $305_2$ | Ageing $310_2$ |
| Global Memory Bank $240_3$ | Fall Through Time $305_3$ | Ageing $310_3$ |
| ⋮ | ⋮ | ⋮ |
| Global Memory Bank $240_N$ | Fall Through Time $305_N$ | Ageing $310_N$ |

FIG. 3

| Unmirrored (Read) Policy Region 205 | |
|---|---|
| Global Memory Bank $240_1$ | Fall Through Time $305_1$ |
| Global Memory Bank $240_2$ | Fall Through Time $305_2$ |
| Global Memory Bank $240_3$ | Fall Through Time $305_3$ |
| ⋮ | ⋮ |
| Global Memory Bank $240_N$ | Fall Through Time $305_N$ |

FIG. 4

| Mirrored (Write) Policy Region 210 | | |
|---|---|---|
| Global Memory Bank $240_1$ | Fall Through Time $305_1$ | Ageing $310_1$ |
| Global Memory Bank $240_2$ | Fall Through Time $305_2$ | Ageing $310_2$ |
| Global Memory Bank $240_3$ | Fall Through Time $305_3$ | Ageing $310_3$ |
| ⋮ | ⋮ | ⋮ |
| Global Memory Bank $240_N$ | Fall Through Time $305_N$ | Ageing $310_N$ |

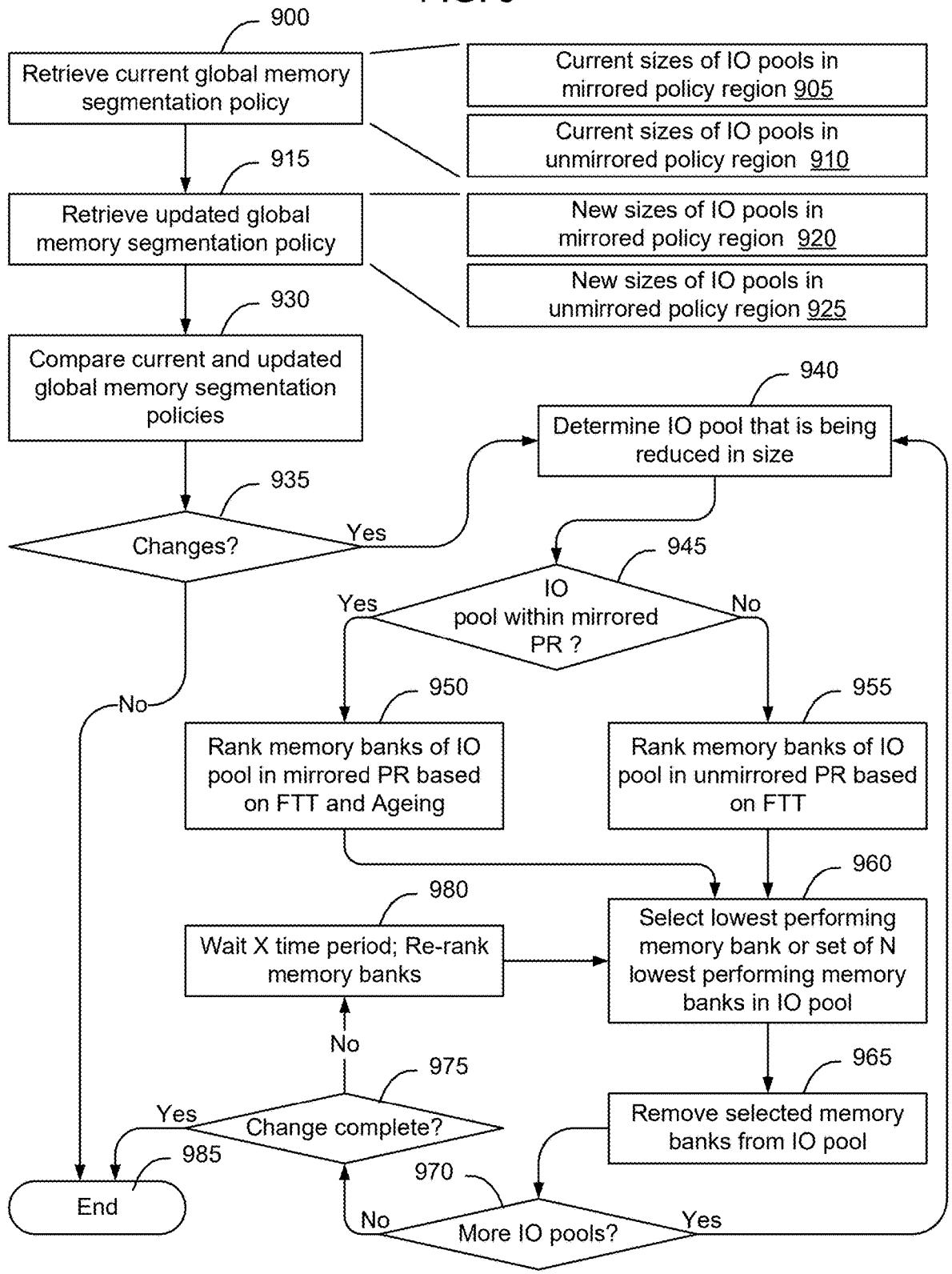

GLOBAL MEMORY SEGMENTATION CONVERSION

FIELD

This disclosure relates to computing systems and related devices and methods, and, more particularly, to a method and apparatus for conversion of global memory segmentation in connection with implementation of global memory segmentation policy changes.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for shared global memory segmentation conversion is provided. In some embodiments, shared global memory of a storage system is segmented into a mirrored policy region and an unmirrored policy region. The mirrored policy region is used to hold new data that is presented to the storage system in connection with host write IO operations. The unmirrored policy region is used to hold old data that is being provided by the storage system to hosts in connection with host read IO operations. Within each policy region, the shared global memory is divided into IO pools, in which each IO pool is used to implement slots of shared global memory having a respective given slot size. Example slot sizes might include 16 KB, 32 KB, 64 KB, and 128 KB, although the particular slot sizes of a set of IO pools will depend on the particular implementation. Within each IO pool, the shared global memory is divided into Global Memory (GM) banks of fixed size. Example GM bank sizes might be, for example, 128 MB, 256 MB, 0.5 GB, although the particular sizes of a set of GM banks will depend on the particular implementation.

A global memory management system applies a dynamic global memory segmentation policy to the global memory to optimize use of global memory. For example, at time T1 the global memory segmentation policy might be to have 40% of shared global memory allocated to implement the mirrored policy region, and 60% of shared global memory allocated to implement the unmirrored policy region. At time T2 the global memory segmentation policy might change such that 50% of shared global memory is allocated to implement the mirrored policy region, and 50% of shared global memory is allocated to implement the unmirrored policy region. Global memory segmentation policy changes can also affect the size of each of the IO pools within a given policy region, and hence the number of GM banks that are used to implement each of the policy regions and each of the IO pools within each of the policy regions.

Regardless of how the sizes of the policy regions and IO pools are determined, when there is a change in the global memory segmentation policy, the configuration of the global memory will need to be changed to enable the global memory segmentation to be converted to meet the requirements of the new global memory segmentation policy. Specifically, to meet the requirements of the new global memory segmentation policy, some of the GM banks will need to be moved from being initially allocated to a first policy region to being allocated to the second policy region, or from being allocated from a first IO pool to a second IO pool within a given policy region.

According to some embodiments, a shared global memory segmentation conversion process is provided that is configured to optimize conversion of shared global memory in connection with changes to a global memory segmentation policy. According to some embodiments, when a policy region is to be reduced in size, the GM banks of the policy region are ranked and one or more of the lowest performing GM banks in the policy region are selected to be moved to the other policy region. This process iterates, re-ranking the remaining GM banks in the policy region that is being reduced in size and selecting the lowest ranked GM banks for movement, until the correct allocation of global memory to policy regions is achieved. Similarly, within each policy region, the IO pools that are being reduced in size are determined and the GM banks of each IO pool that is being reduced in size are ranked. One or more of the lowest performing GM banks in the IO pool that is being reduced in size are selected and moved to an IO pool that is being increased in size. This process iterates, re-ranking the remaining GM banks in the IO pool that is being reduced in size and selecting the lowest ranked GM banks for movement, until the correct allocation of global memory to IO pools is achieved. In some embodiments, GM banks in the unmirrored policy region, that is used to implement read IO operations, are ranked using fall through time. In some embodiments, GM banks in the mirrored policy region, that is used to implement write IO operations, are ranked using a combination of both fall through time and ageing.

In some embodiments, a method of conversion of global memory segmentation, includes applying a global memory segmentation policy to a global memory, the global memory including a plurality of global memory banks, the global memory segmentation policy specifying a first size of a first mirrored policy region to be implemented by assigning a first plurality of GM banks to the first mirrored policy region, and the global memory segmentation policy specifying a second size of a second unmirrored policy region to be implemented by assigning a second plurality of GM banks to the second unmirrored policy region, and receiving a new global memory segmentation policy to be applied to the global memory, the new global memory segmentation policy specifying a new size of the first mirrored policy region to be implemented by assigning a new first plurality of GM banks to the first mirrored policy region, and the global memory segmentation policy specifying a new size of the second unmirrored policy region to be implemented by assigning a new second plurality of GM banks to the second mirrored policy region. The method further includes determining if the new global memory segmentation policy requires the first mirrored policy region to be reduced in size or if the new global memory segmentation policy requires the second unmirrored policy region to be reduced in size. In response to a determination that the first mirrored policy region is being reduced in size, ranking the first plurality of GM banks of the first mirrored policy region according to performance, and selecting a subset of the first plurality of GM banks of the first mirrored policy region to be added to the second plurality of GM banks of the second unmirrored policy region. lin response to a determination that the second unmirrored policy region is being reduced in size, ranking the second plurality of GM banks of the second unmirrored policy region according to performance, and selecting a subset of the second plurality of GM banks of the second unmirrored policy region to be added to the first plurality of GM banks of the first mirrored policy region.

In some embodiments, a system for conversion of global memory segmentation includes one or more processors and one or more storage devices storing instructions that are operable, when executed by the one or more processors, to cause the one or more processors to perform operations including applying a global memory segmentation policy to a global memory, the global memory including a plurality of global memory banks, the global memory segmentation policy specifying a first size of a first mirrored policy region to be implemented by assigning a first plurality of GM banks to the first mirrored policy region, and the global memory segmentation policy specifying a second size of a second unmirrored policy region to be implemented by assigning a second plurality of GM banks to the second unmirrored policy region, and receiving a new global memory segmentation policy to be applied to the global memory, the new global memory segmentation policy specifying a new size of the first mirrored policy region to be implemented by assigning a new first plurality of GM banks to the first mirrored policy region, and the global memory segmentation policy specifying a new size of the second unmirrored policy region to be implemented by assigning a new second plurality of GM banks to the second mirrored policy region. The operations further include determining if the new global memory segmentation policy requires the first mirrored policy region to be reduced in size or if the new global memory segmentation policy requires the second unmirrored policy region to be reduced in size. In response to a determination that the first mirrored policy region is being reduced in size, ranking the first plurality of GM banks of the first mirrored policy region according to performance, and selecting a subset of the first plurality of GM banks of the first mirrored policy region to be added to the second plurality of GM banks of the second unmirrored policy region. In response to a determination that the second unmirrored policy region is being reduced in size, ranking the second plurality of GM banks of the second unmirrored policy region according to performance, and selecting a subset of the second plurality of GM banks of the second unmirrored policy region to be added to the first plurality of GM banks of the first mirrored policy region.

In some embodiments, ranking the first plurality of GM banks of the first mirrored policy region according to performance includes ranking the first plurality of GM banks according to a combination of ageing and fall through time of the GM banks.

In some embodiments, ranking the second plurality of GM banks of the second unmirrored policy region according to performance includes ranking the second plurality of GM banks according to fall through time of the GM banks.

In some embodiments, selecting the subset of the first plurality of GM banks of the first mirrored policy region to be added to the second plurality of GM banks of the second unmirrored policy region includes initially selecting a group of fewer than a total number of the subset of the first plurality of GM banks for movement, re-ranking remaining GM banks of the first mirrored policy region, selecting another group of fewer than the total number of the subset of the first plurality of GM banks for movement, and iterating the process of re-ranking the remaining GM banks and selecting another group of fewer than the total number of the subset until the total number of the subset of the first plurality of GM banks has been selected.

In some embodiments, selecting the subset of the second plurality of GM banks of the second mirrored policy region to be added to the first plurality of GM banks of the first unmirrored policy region includes initially selecting a group of fewer than a total number of the subset of the second plurality of GM banks for movement, re-ranking remaining GM banks of the second mirrored policy region, selecting another group of fewer than the total number of the subset of the second plurality of GM banks for movement, and iterating the process of re-ranking the remaining GM banks and selecting another group of fewer than the total number of the subset until the total number of the subset of the second plurality of GM banks has been selected.

In some embodiments, the global memory segmentation policy further specifies sizes of a first plurality of IO pools within the first mirrored policy region and sizes of a second plurality of IO pools within the second unmirrored policy region, and the new global memory segmentation policy further specifies new sizes of the first plurality of IO pools within the first mirrored policy region and new sizes of the second plurality of IO pools within the second unmirrored policy region.

In some embodiments, the method steps or the operations further include determining if the new global memory segmentation policy requires an IO pool to be reduced in size, in response to a determination that an IO pool is required to be reduced in size, determining if the IO pool that is being reduced in size is within the first mirrored policy region or within the second unmirrored policy region, in response to a determination that the IO pool that is required to be reduced in size is within the first mirrored policy region, ranking GM banks of the IO pool that is required to be reduced in size according to a first performance criteria, and selecting a subset of the GM banks of the IO pool that is required to be reduced in size to be moved to an IO pool that is being increased in size, and in response to a determination that the IO pool that is required to be reduced in size is within the second unmirrored policy region, ranking GM banks of the IO pool that is required to be reduced in size according to a second performance criteria, different from the first performance criteria, and selecting a subset of the GM banks of the IO pool that is required to be reduced in size to be moved to the IO pool that is being increased in size.

In some embodiments, the first performance criteria includes a combination of ageing and fall through time of the GM banks of the IO pool that is required to be reduced in size, and the second performance criteria includes the fall through time of the GM banks of the IO pool that is required to be reduced in size. In some embodiments, the first mirrored policy region is used to store data received from hosts in connection with host write operations, and ageing identifies an average amount of time data is stored in a given GM bank prior to being destaged to back-end storage resources. In some embodiments, the second unmirrored policy region is used to store data to be provided to hosts in connection with host read operations, and fall through time identifies an average amount of time it takes for a piece of data to be evicted from a given GM bank when data contained within the GM bank is managed using a virtual First In First Out (FIFO) queue.

BRIEF DESCRIPTION OF THE DRAWINGS

FIG. 3 is a block diagram of an example unmirrored (read) policy region showing performance of the GM banks implementing the policy region being evaluated using fall through time metrics, according to some embodiments.

FIG. 4 is a block diagram of an example mirrored (write) policy region showing performance of the GM banks implementing the policy region being evaluated using fall through time and ageing metrics, according to some embodiments.

FIG. 9 is a flow chart of an example process of shared global memory segmentation conversion, showing a process of optimizing selection of GM banks for movement between IO pools within a given policy region to implement a dynamic global memory segmentation policy change, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
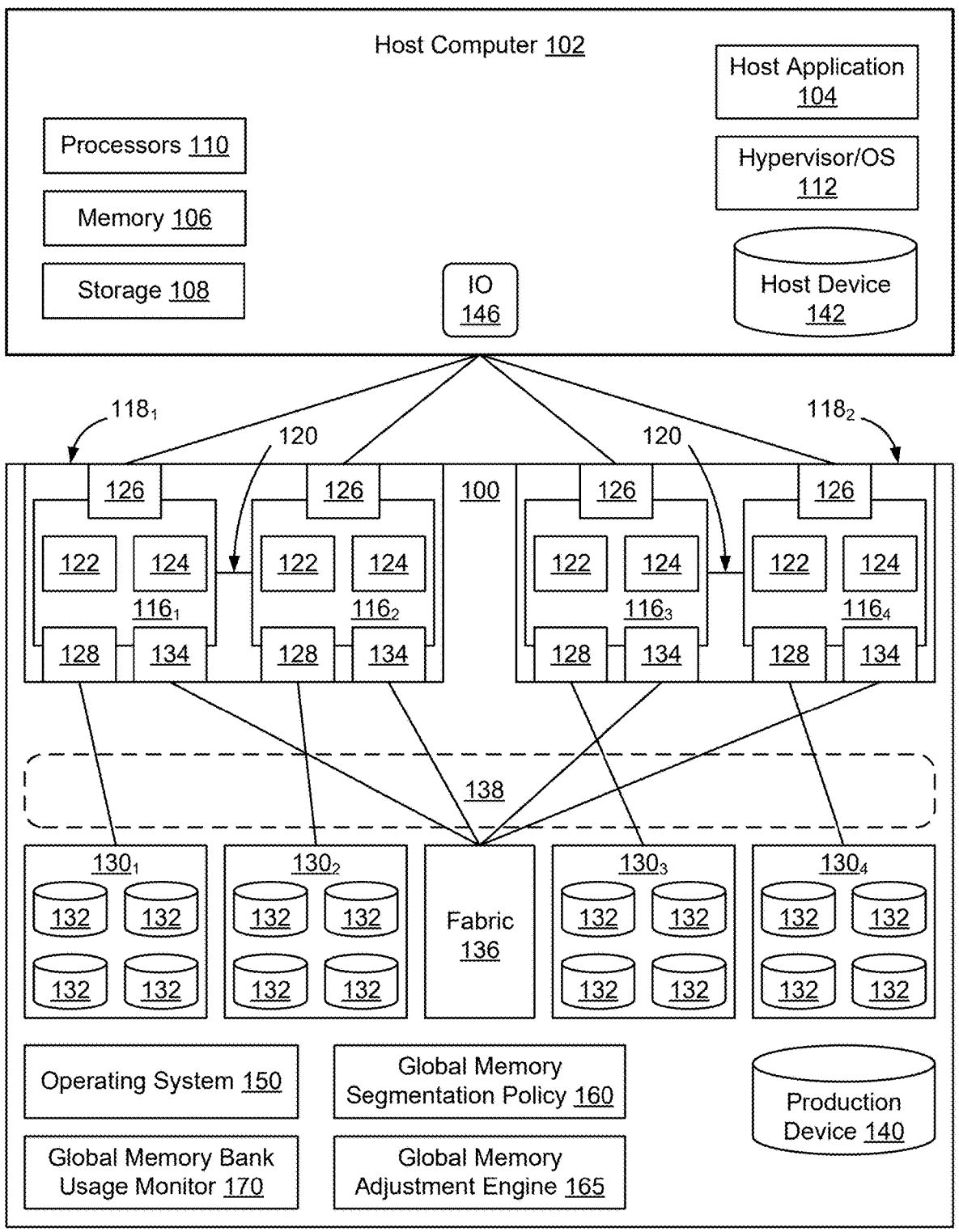
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays 130₁-130₄, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then a slot of shared global memory is allocated to the read IO and the requested data is temporarily copied into the allocated slot of virtual shared memory 138 from the managed drives 132 and sent to the host application 104 by the front-end adapter 126 of one of the compute nodes $116_1$-$116_4$. In the case where the IO 146 is a write command, in some embodiments the storage system 100 allocates a slot of shared global memory to the write IO, copies a block being written into the virtual shared memory 138, marks the data as dirty, and creates new metadata that maps the address of the data on the production device 140 to a location to which the block is written on the managed drives 132.

In some embodiments, the shared global memory is able to be allocated using slots of different sizes. Further, depending on the type of IO, the slots of shared global memory that are allocated to the IO operations are either mirrored or unmirrored. For example, when a write IO is received by the storage engine 118 from a host 102, the write IO contains data that is not otherwise stored on the storage system 100. Accordingly, in some embodiments the compute nodes $116_1$, $116_2$, implement a mirrored policy on a portion of each compute nodes' high-speed memory 124, which results in the same data being written to both the high-speed memory $124_1$ of compute node $116_1$, and to high-speed memory $124_2$ of compute node $116_2$. This provides redundant copies of the data associated with a write IO such that, if one of the compute nodes fails, the other compute node still has a copy of the data stored in other storage resources. Implementing a mirrored policy on regions of the high-speed memory 124 is therefore important in connection with processing write IOs by the storage engine 118.

When a read IO is received by the storage engine 118 from a host 102, the read IO requests data that is already stored on the storage system. Accordingly, when the read IO is processed by one of the compute nodes 116, the data does not need to be placed in a mirrored region of high-speed memory 124, since a backup copy of the data continues to reside in back-end storage resources 130. By applying an unmirrored policy to a portion of the high-speed memory 124 it is therefore possible to increase the number of slots of high-speed memory 124 that are available to process IO operations on the storage engine 118.

In some embodiments the storage system 100 applies a global memory segmentation policy 160 to global memory 138 that determines the relative proportion of shared global memory that should be allocated to the unmirrored policy region and to the mirrored policy region. The global memory segmentation policy 160 can change over time, to enable the configuration of global memory to be optimized based on current or forecast workloads on the storage system.

As used herein, the term "policy region" refers to a region of the high-speed memory 124 where a particular policy (mirrored policy or unmirrored policy) is applied. A given region of the high-speed memory will either have a "mirrored" policy applied to it or an "unmirrored" policy applied to it.

Within each policy region, the shared global memory is divided into IO pools, in which each IO pool is used to implement slots of shared global memory having a respective given slot size. Example slot sizes might include 16 KB, 32 KB, 64 KB, and 128 KB, although the particular slot sizes of a set of IO pools will depend on the particular implementation. Within each IO pool, the shared global memory is divided into Global Memory (GM) banks of fixed size. Example GM bank sizes might be, for example, 128 MB, 256 MB, 0.5 GB, although the particular sizes of a set of GM banks will depend on the particular implementation.

A global memory management system applies a dynamic global memory segmentation policy to the global memory to optimize use of global memory. For example, at time T1 the global memory segmentation policy might be to have 40% of shared global memory allocated to implement the mirrored policy region, and 60% of shared global memory allocated to implement the unmirrored policy region. At time T2 the global memory segmentation policy might change such that 50% of shared global memory is allocated to implement the mirrored policy region, and 50% of shared global memory is allocated to implement the unmirrored policy region. Global memory segmentation policy changes can also affect the size of each of the IO pools within a given policy region, and hence the number of GM banks that are used to implement each of the policy regions and each of the IO pools within each of the policy regions.

By dynamically changing the size of the policy regions of the high-speed memory, and dynamically adjusting the segmentation size of the slots of the policy regions of high-speed memory, it is possible to greatly increase the number of slots that are able to be created within the high-speed memory, when compared with application of a fixed set of policy regions to the high-speed memories of the pairs of compute nodes of the storage engine. Accordingly, various algorithms have been developed that are configured to predict future workloads on the storage system, and dynamically change the configuration of shared global memory, for example by changing the proportion of the shared global memory that is allocated to the mirrored policy region vs the proportion of the shared global memory that is allocated to the unmirrored policy region. The algorithms have also been developed that are configured to dynamically change the IO pools within the policy regions to change the number of slots of particular sizes that are contained within each of the policy regions. An example process for determining global memory segmentation is described, for example, in U.S. Pat. No. 11,650,763, the content of which is hereby incorporated herein by reference. The techniques described herein are agnostic as to the particular process used to determine the particular global memory segmentation policy, since the techniques described herein are focused on implementing the segmentation conversion operations on the global memory, once a determination has been made to change the segmentation policy that is to be applied to the global memory.

Accordingly, regardless of how the sizes of the policy regions and IO pools are determined, when there is a change in the global memory segmentation policy, the configuration of the global memory will need to be changed to enable the global memory segmentation to be converted to meet the requirements of the new global memory segmentation policy. Specifically, to meet the requirements of the new global memory segmentation policy, some of the GM banks will need to be moved from being initially allocated to a first policy region to being allocated to the second policy region, or from being allocated from a first IO pool to a second IO pool within a given policy region.

When the dynamic global memory segmentation policy 160 is changed such that a new policy needs to be implemented on shared global memory, in some embodiments the storage system 100 includes a global memory adjustment engine 165 that is used to implement the shared global memory segmentation conversion process. Specifically, in some embodiments the global memory adjustment engine 165 is used to select GM banks that should be converted from a first purpose to a second purpose to implement the segmentation conversion. For example, a given GM bank might be moved from the unmirrored policy region to the mirrored policy region, or from the mirrored policy region to the unmirrored policy region. Likewise, within a policy region, a given GM bank might be moved from a first IO pool to a second IO pool.

When a given GM bank is selected to be moved between policy regions of the global memory or between IO pools, the data contained in the GM bank is lost, which can reduce the proportion of read IOs or write IOs that are able to be implemented from global memory. If GM banks are selected randomly to implement the global memory segmentation conversion, and a high performing GM bank is selected, the inclusion of the GM bank in the segmentation conversion can have a larger negative affect on storage system performance. For example, in some embodiments shared global memory is used to perform IO operations for hosts. If a host submits a read IO on data that is already contained in shared global memory, the storage system is able to respond to the read IO without first moving the data into shared global memory. Thus, a host read on data that is already contained in shared global memory can be implemented much quicker than a host read on data that is not contained in shared global memory. If a GM bank is selected that is a high performing GM bank, which is experiencing a high host read hit rate, this can cause a significant number of host reads to need to be served from back-end storage resources rather than from shared global memory, thus slowing down the overall responsiveness of the storage system for a period of time during which the share global memory segmentation conversion process is being implemented.

According to some embodiments, a shared global memory segmentation conversion process is provided that is configured to optimize conversion of shared global memory in connection with changes to a global memory segmentation policy. According to some embodiments, when a given policy region is to be reduced in size, the GM banks of the given policy region are ranked and one or more of the lowest performing GM banks in the given policy region are selected to be moved to the other policy region. Rather than moving all GM banks at once, in some embodiments a small number of GM banks is initially selected to be moved and the process iterates, re-ranking the remaining GM banks in the policy region that is being reduced in size and selecting one or a small number of GM banks to be moved, until the correct allocation of global memory to policy regions is achieved. Similarly, within each policy region, the IO pools that are being reduced in size are determined and the GM banks of each IO pool that is being reduced in size are ranked. One or more of the lowest performing GM banks in the IO pool that is being reduced in size are selected and moved to an IO pool that is being increased in size. This process iterates, re-ranking the remaining GM banks in the IO pool that is being reduced in size and selecting one or a small number of GM banks to be moved, until the correct allocation of global memory to IO pools is achieved.

Figure 2:
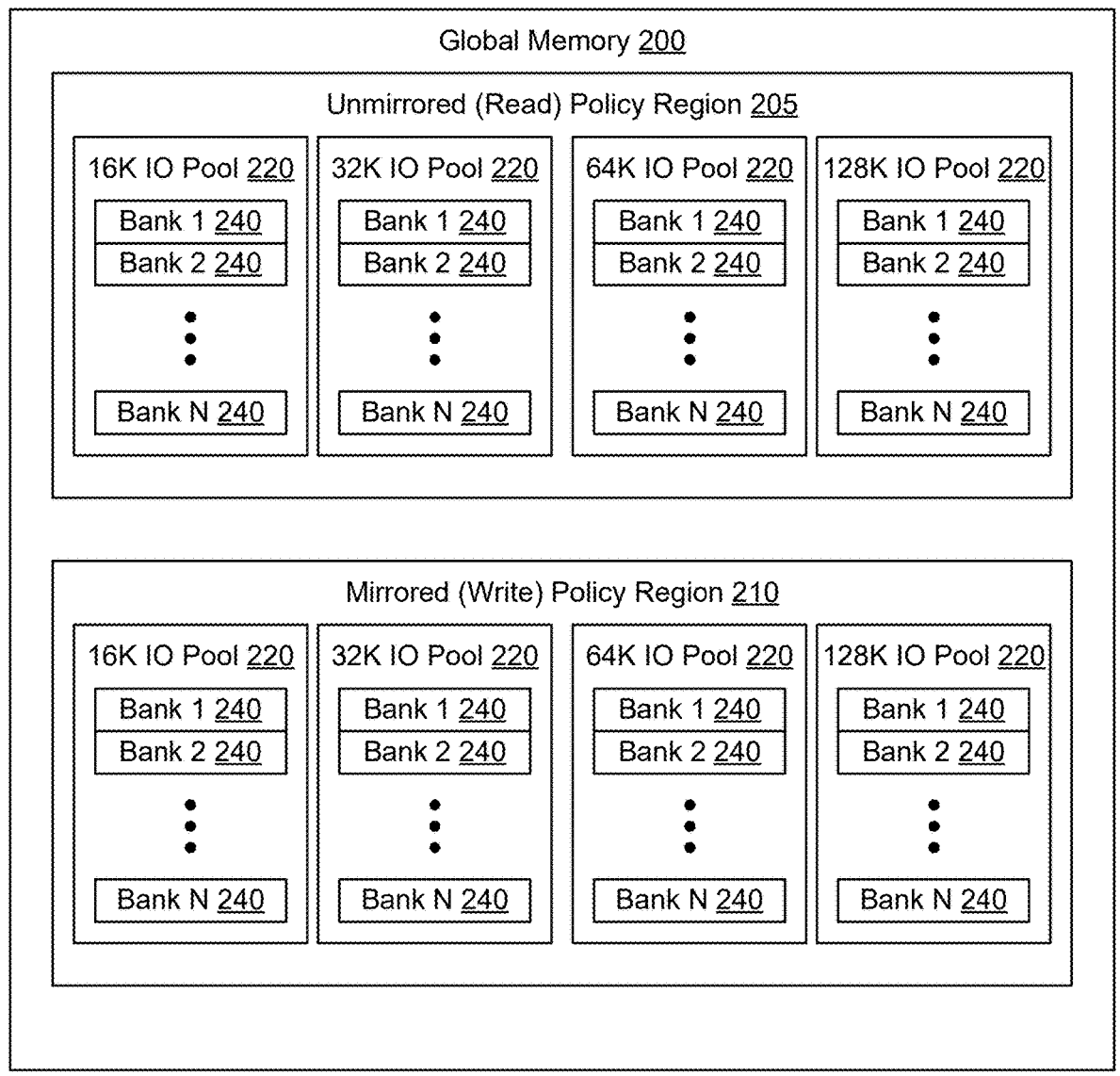
FIG. 2 is a block diagram of an example shared global memory having an unmirrored policy region and a mirrored policy region, with each policy region being divided into IO pools, each IO pool being implemented using a plurality of Global Memory (GM) banks, according to some embodiments.

FIG. 2 is a block diagram of an example shared global memory 200 having an unmirrored policy region 205 and a mirrored policy region 210, with each policy region being divided into IO pools 220, each IO pool 220 being implemented using a plurality of Global Memory (GM) banks 240, according to some embodiments. As shown in FIG. 2, in some embodiments shared global memory 200 includes an unmirrored policy region 205 and a mirrored policy region 210. The unmirrored policy region 205 includes a plurality of IO pools 220, each IO pool being used to create slots having different respective slot sizes. FIG. 2 shows an example in which the unmirrored policy region 205 includes a first IO pool 220 that is used to create slots having slot size of 16 KB, a second IO pool 220 that is used to create slots having slot size of 32 KB, a third IO pool 220 that is used to create slots having slot size of 64 KB, and a fourth IO pool 220 that is used to create slots having slot size of 128 KB. Different embodiments might use IO pools to implement slot sizes different than those shown in the example of FIG. 2. As shown in FIG. 2, in some embodiments the mirrored policy region 210 similarly is divided into a plurality of IO pools 220, each IO pool being used to create slots having different respective slot sizes. It should be understood that the particular number of IO pools within the mirrored policy region 210 and unmirrored policy region 205 will depend on the particular shared global memory segmentation policy and, accordingly, the configuration shown in FIG. 2 is merely intended as an example.

Within each IO pool, chunks of global memory referred to herein as Global Memory (GM) banks are used to implement the global memory allocation. Example GM bank sizes might be, for example, 128 MB, 256 MB, 512 MB, or some other chunk size. In some embodiments, the GM bank forms the minimum granularity for implementation of a shared global memory segmentation policy. When global memory segmentation policy changes are implemented, chunks of global memory at granularity of the GM bank level are used to implement the policy change, by causing GM banks to be moved between policy regions or to cause GM banks to be moved between IO pools of a given policy region. In instances where a global memory segmentation policy change involves both changes in policy region size and changes in IO pools, a given GM bank may be moved from an IO pool that is being reduced in size in a first policy region, to an IO pool that is being increased in size in the second policy region in connection with the shared global memory segmentation policy change.

FIG. 3 is a block diagram of an example unmirrored (read) policy region 205 showing performance of the GM banks implementing the policy region being evaluated using fall through time metrics, according to some embodiments. According to some embodiments, as shown in FIG. 3, in the unmirrored policy region one way to rank the GM banks is by determining a fall through time 305 for each respective GM bank.

In some embodiments, data stored within the slots of a given GM bank is managed in a manner similar to how a First In First Out memory operates, for example using a virtual FIFO queue. For example, in a FIFO queue, when a piece of data is requested it is added to the head of the queue. In embodiments where a virtual FIFO queue is used to determine which slots of data should be kept in the GM bank and which can be overwritten, the virtual FIFO queue has a depth equal to the number of slots of the GM bank (GM bank size/GM bank slot size). Each time a different piece of data is requested, it is added to the head of the queue. Each time that piece of data that is in the GM bank is re-requested, it is moved back to the head of the queue. When a piece of data is at the tail of the queue and another piece of data is added to the head of the queue, the data that is at the tail of the queue is evicted, such that the data that is contained in the slot identified as correlating to the tail of the queue is overwritten or destaged to back-end storage resources.

In some embodiments, the average amount of time it takes for a piece of data to be evicted from the GM bank is referred to as the fall-through time 305. A GM bank with a long fall-through time means that, on average, the data that is contained in the GM bank is being re-requested, which means that the GM bank is having a high hit ratio. A GM bank with a short fall-through time means that the GM bank is having a lower hit ratio. According to some embodiments, GM banks in the unmirrored (read) policy region 205 are ranked using the fall through time 305, in which a longer fall through time is indicative of a higher performing GM bank and a shorted fall through time is indicative of a lower performing GM bank. According to some embodiments, when looking to select GM banks within the unmirrored policy region need to be moved to the mirrored policy region to implement a change to the shared global memory segmentation policy 160, lower performing GM banks with shorter fall through times are preferentially selected over GM banks with higher fall through times.

FIG. 4 is a block diagram of an example mirrored (write) policy region showing performance of the GM banks implementing the policy region being evaluated using fall through time and ageing metrics, according to some embodiments. As shown in FIG. 4, in some embodiments both ageing and fall through time are equally used to rank GM banks of the mirrored policy region. When data is received in connection with a write IO, the data is stored in shared global memory and, at a later point, a decision is made to destage the data from shared global memory to back-end storage resources 132.

The average amount of time data is stored in the slots of a given GM bank prior to being destaged to back-end storage resources is referred to herein as ageing. When a storage system is not experiencing undue pressure from host writes, it can be advantageous to delay destaging data to back-end storage resources, because the host might decide to send a subsequent write to the same track, thus resulting in a write hit, and also avoiding the use of back-end resources required to destage the data to disk. In some embodiments, ageing is based on an average of how long data has been held in the slots of a given GM bank. In some embodiments, when looking to select GM banks within the mirrored policy region to be repurposed in connection a shared global memory segmentation conversion process, the lower performing GM banks with a combination of shorter fall through time and shorter ageing are preferentially selected over GM banks with combined higher fall through times and higher ageing. In some embodiments, fall through time and ageing are equally weighted when selecting GM banks to be moved from the mirrored policy region to the unmirrored policy region to implement a change to the shared global memory segmentation policy 160.

Figure 5:
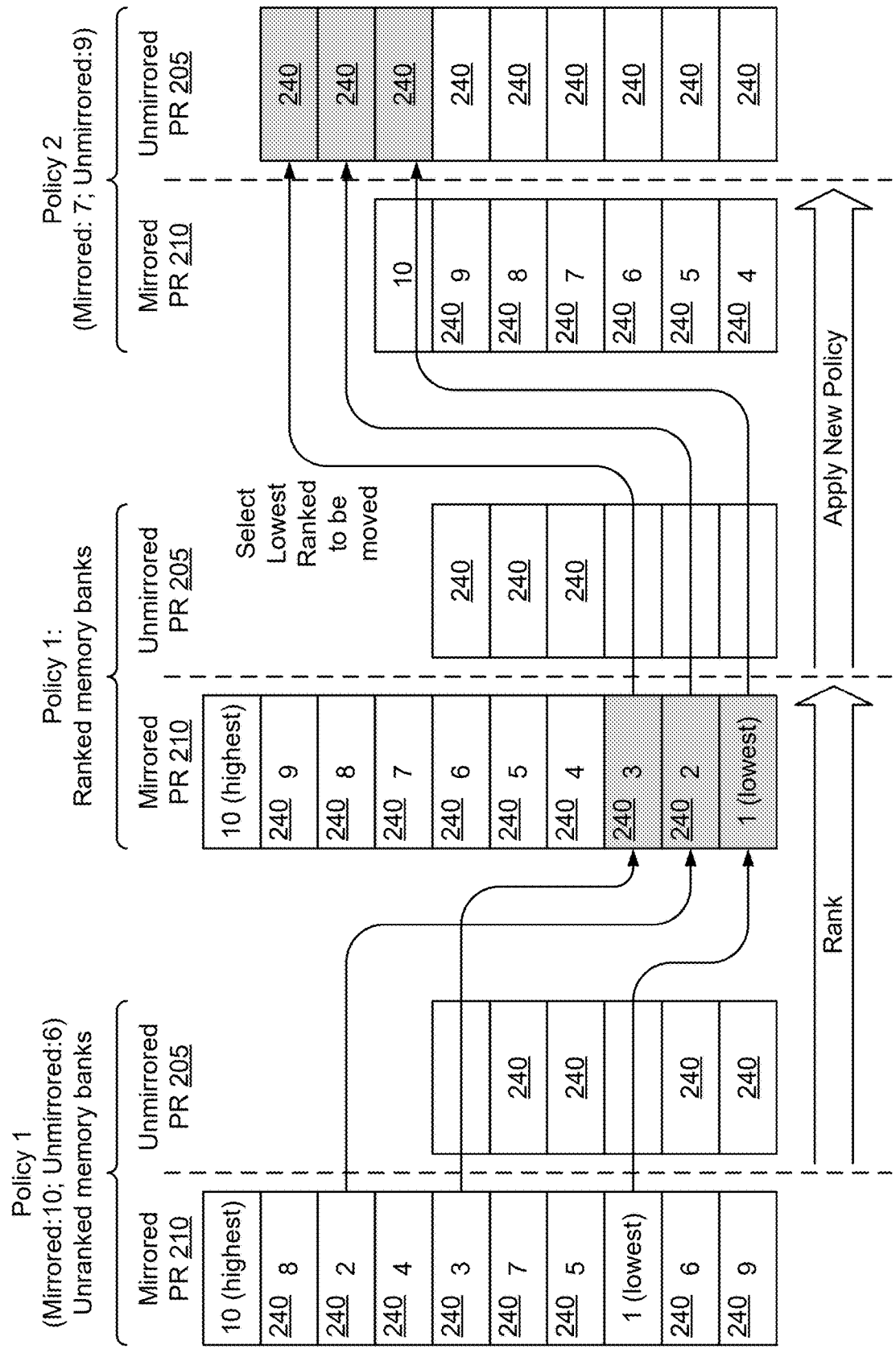
FIG. 5 is a block diagram graphically illustrating a process of shared global memory segmentation conversion in which a policy change requires a reduction in size of the mirrored policy region, according to some embodiments.

FIG. 5 is a block diagram graphically illustrating a process of shared global memory segmentation conversion in which a policy change requires a reduction in size of the mirrored policy region, according to some embodiments. In the example shown in FIG. 5, the initial shared global memory segmentation policy (policy 1 on the left-hand side of FIG. 5) provided that the mirrored policy region 210 should have ten GM banks and the unmirrored policy region 205 should have six GM banks. The new policy configuration of shared global memory (policy 2 on the right-hand side of FIG. 5) provides that the mirrored policy region 210 should have seven GM banks and that the unmirrored policy region 205 should have nine GM banks. This means that three GM banks need to be moved from the mirrored policy region 210 to the unmirrored policy region 205 to implement the shared global memory segmentation conversion, to enable the shared global memory to be configured according to the updated global memory segmentation policy 160.

Accordingly, as shown in FIG. 5, because the size of the mirrored policy region is being decreased, the GM banks of the mirrored policy region are ranked from highest performing to lowest performing. As noted above, the mirrored policy region is used to implement write IOs and, according to some embodiments, a combination of ageing and fall through time is used to rank the GM banks of the mirrored policy region. The three lowest performing GM banks are selected and repurposed by causing the three lowest GM banks to be added to the unmirrored policy region. Although FIG. 5 shows movement of all three GM banks, as described in greater detail below in connection with FIGS. 8 and 9, in some embodiments movement of GM banks between policy regions is implemented in phases, such that ranking and selection of GM banks for movement is iterated to move small numbers of GM banks over time until the segmentation conversion process has been completed. This prevents a large portion of shared global memory from being simultaneously converted, thus reducing the impact of global memory segmentation conversion on storage system performance.

Although not shown in FIG. 5, in some embodiments when a change to the global memory policy is specified, the policy change will also specify new sizes of the IO pools within the policy region that is being reduced in size. According to some embodiments, the lowest performing GM banks from an IO pool that is being reduced in size within the policy region that is being reduced in size are preferentially selected. This enables movement of a given GM bank to both reduce the size of the policy region as well as reduce the size of a given IO pool within the policy region.

Figure 6:
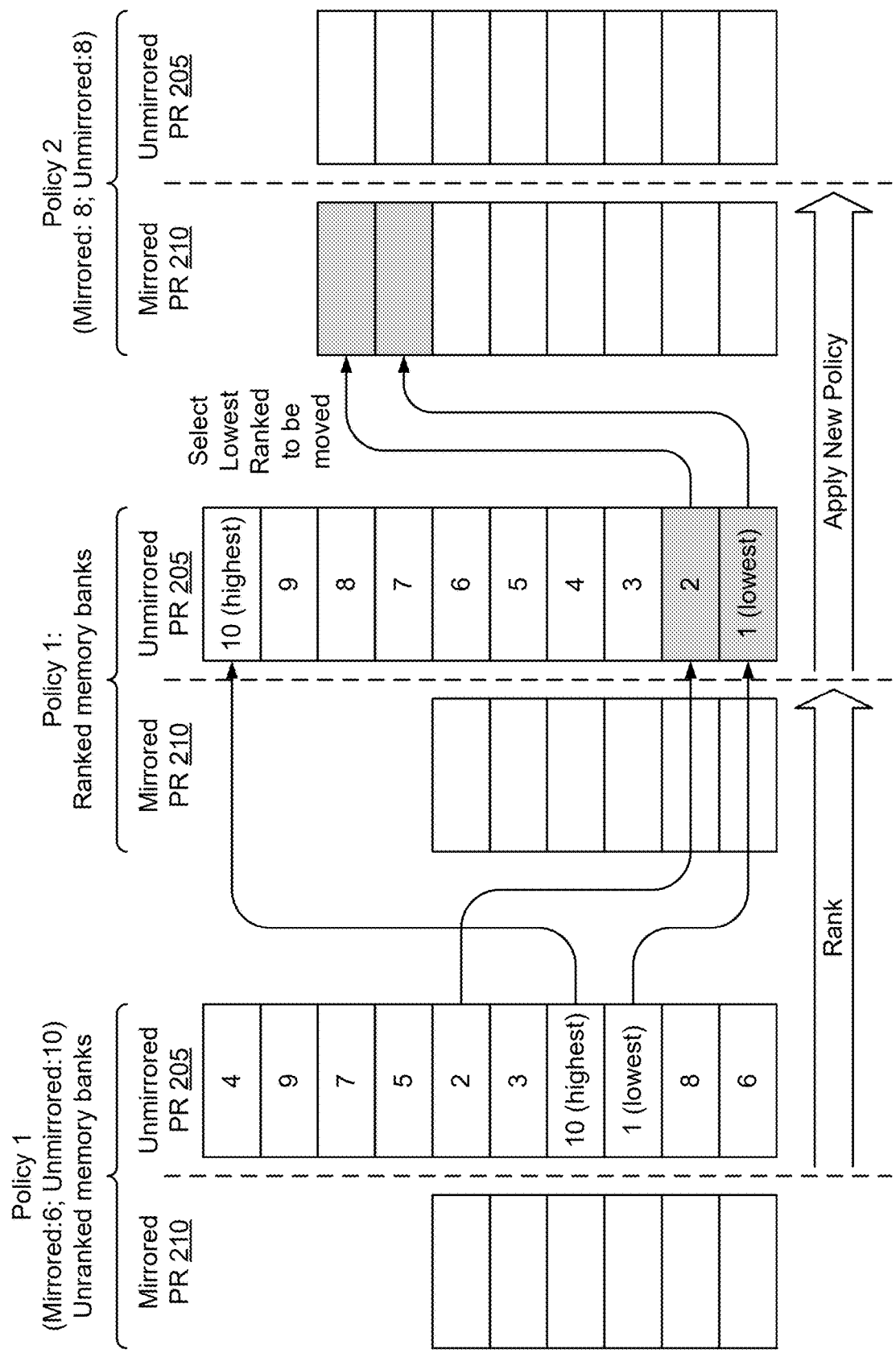
FIG. 6 is a block diagram graphically illustrating a process of shared global memory segmentation conversion in which a policy change requires a reduction in size of the unmirrored policy region, according to some embodiments.

FIG. 6 is a block diagram graphically illustrating a process of shared global memory segmentation conversion in which a policy change requires a reduction in size of the unmirrored policy region, according to some embodiments. In FIG. 6, the initial policy (policy #1 on the left-hand size) provided that the unmirrored policy region would include ten GM banks and that the mirrored policy region would include six GM banks. The new policy (policy #2 on the right-hand side) requires each policy region to include eight GM banks 240. Accordingly, to implement the shared global memory segmentation conversion, two GM banks will need to be selected from the unmirrored policy region 205 to be added to the mirrored policy region 210. As shown in FIG. 6, in some embodiments the GM banks of the unmirrored policy region 205 are ranked according to fall through time, and the two lowest ranked GM banks (the GM banks with the shorted fall through time) are selected to be moved to the mirrored policy region 210.

Figure 7:
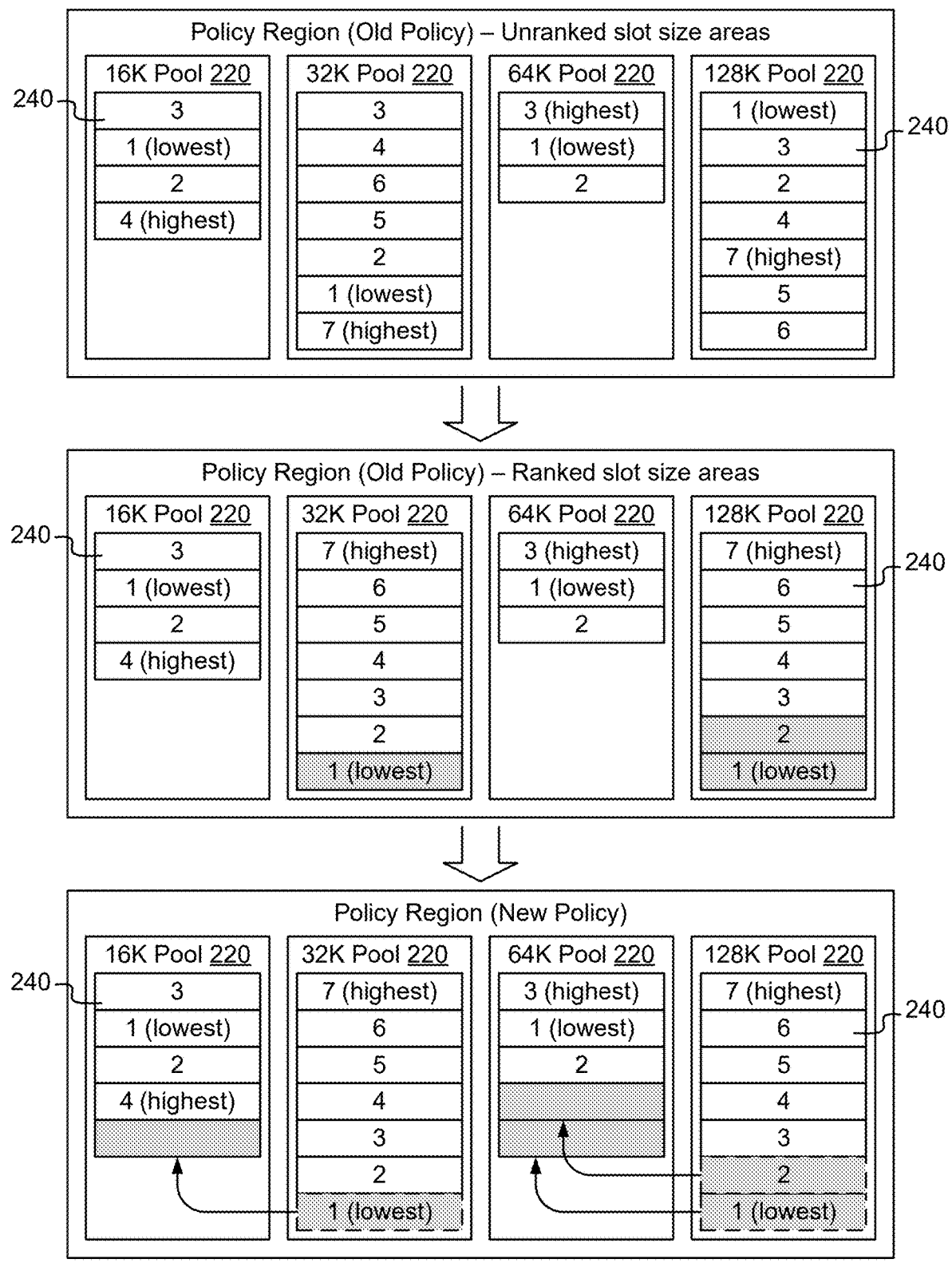
FIG. 7 is a block diagram graphically illustrating a process of shared global memory segmentation conversion in which a policy change requires a modification of the IO pools within a given policy region, according to some embodiments.

FIG. 7 is a block diagram graphically illustrating a process of shared global memory segmentation conversion in which a policy change requires a modification of the size of the IO pools within a given policy region, according to some embodiments. As shown in FIG. 7, in some embodiments a change to a global memory segmentation policy can also cause the number of GM banks used to implement the various IO pools within a policy region to change. When a GM bank is to be moved from one IO pool to another IO pool, the IO pool that is being reduced in size is selected, and the GM banks within the IO pool that is being reduced in size are ranked relative to each other. Note—the ranking in this instance only requires ranking of the GM banks that are currently being used to implement the IO pool that is being reduced in size, as shown in the middle of FIG. 7. The lowest performing GM banks of IO pool that are being reduced in size are then selected to cause those IO pools to be correctly sized. The selected GM banks are then added to other IO pools to cause the other IO pools to also be correctly sized. By moving GM banks that are the lowest performing GM banks, it is possible to minimize impact on the storage system when implementing shared global memory segmentation conversion.

Figure 8:
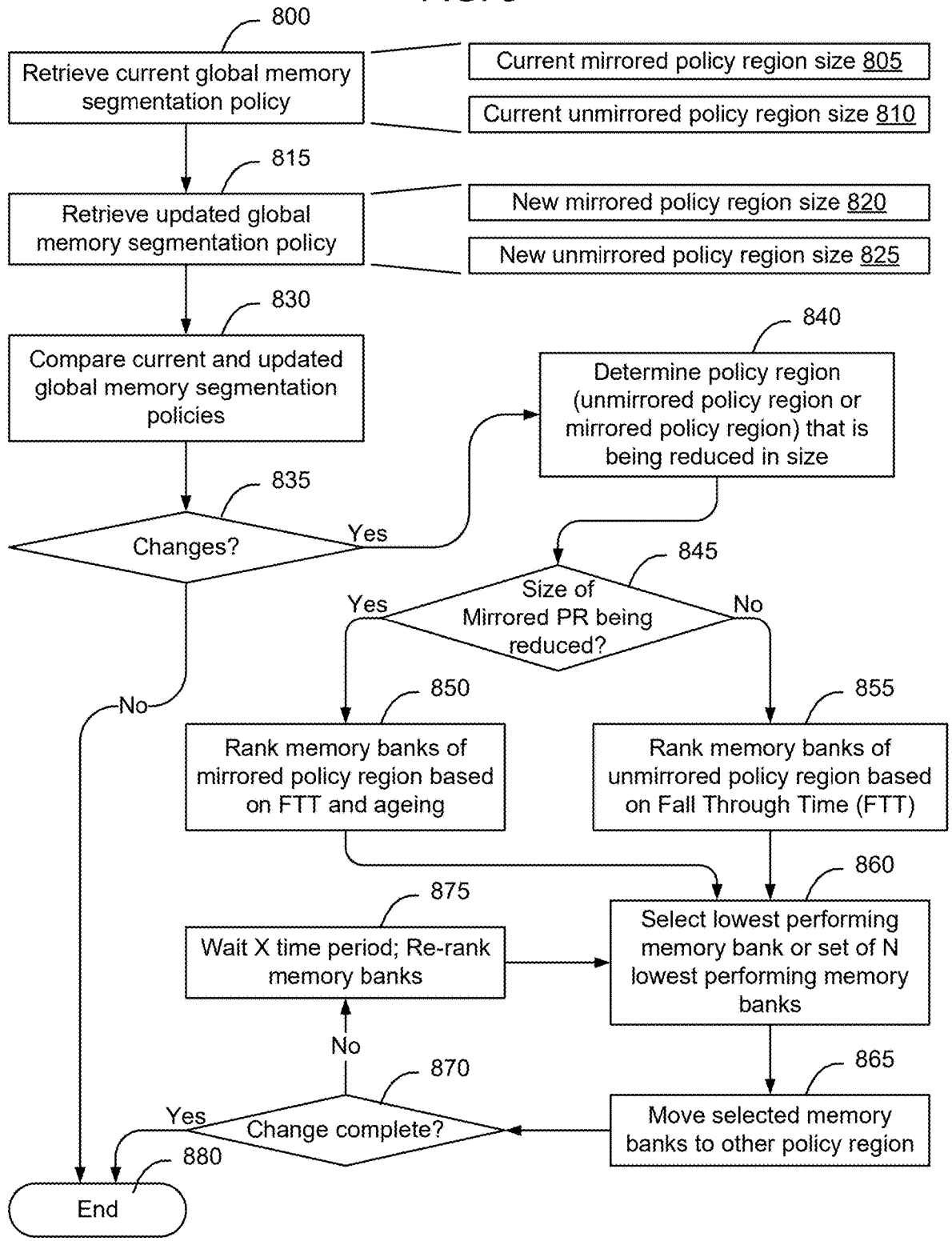
FIG. 8 is a flow chart of an example process of shared global memory segmentation conversion, showing a process of optimizing selection of GM banks for movement between policy regions to implement a dynamic global memory segmentation policy change, according to some embodiments.

FIG. 8 is a flow chart of an example process of shared global memory segmentation conversion, showing a process of optimizing selection of GM banks for movement between policy regions to implement a dynamic global memory segmentation policy change, according to some embodiments. As shown in FIG. 8, in some embodiments the global memory adjustment engine 165 retrieves the current memory segmentation policy (block 800). In some embodiments the current memory segmentation policy includes information specifying the size of the current mirrored policy region (block 805) and the size of the current unmirrored policy region (block 810). The global memory adjustment engine 165 also retrieves the updated global memory segmentation policy (block 815). In some embodiments the updated memory segmentation policy includes information specifying the new size of the mirrored policy region (block 820) and the new size of the unmirrored policy region (block 825). The global memory adjustment engine 165 then implements a comparison between the current and updated global memory segmentation policies (block 830) to determine if there are any changes that need to be made to the sizes of the policy regions (block 835).

In response to a determination that the updated global memory segmentation policy does not include any changes to the sizes of the policy regions (a determination of NO at block 835) the global memory adjustment engine 165 evaluates the global memory segmentation policy to implement any changes to the IO pools (FIG. 9) and aspects of implementation of the global memory segmentation conversion process relative to the policy region size adjustments ends (block 880).

In response to a determination that the updated global memory segmentation policy does include changes to the sizes of the policy regions (a determination of YES at block 835) the global memory adjustment engine 165 determines the policy region (unmirrored or mirrored policy region) that is being reduced in size (block 840).

A policy region that is being reduced in size will have one or more GM banks 240 that will need to be moved to the other policy region that is being increased in size. Accordingly, as described in greater detail herein, the GM banks 240 of the policy region that is being reduced in size are ranked, to enable the lowest performing GM banks 240 to be selected to be moved to the other policy region. In some embodiments, the manner in which the GM banks are ranked depends on which policy region is being reduced in size.

In the example shown in FIG. 8, the global memory adjustment engine 165 determines if the size of the mirrored policy region is being reduced (block 845). Equivalently, the global memory adjustment engine 165 could also determine if the size of the unmirrored policy region is being reduced. In response to a determination that the size of the mirrored policy region is being reduced (a determination of YES at block 845), the global memory adjustment engine 165 ranks the memory banks of the mirrored policy region based on a combination of Fall Through Time (FTT) and ageing of the GM banks (block 850). In response to a determination that the size of the unmirrored policy region is being reduced (a determination of NO at block 845), the global memory adjustment engine 165 ranks the memory banks of the mirrored policy region based on the Fall Through Time (FTT) of the GM banks (block 855).

Regardless of how the GM banks are ranked (block 850 or block 855), after the GM banks of the policy region that is being reduced in size are ranked, the global memory adjustment engine 165 selects a lowest performing GM bank or a set of N lowest performing memory banks (block 860), and moves the selected memory GM banks to the other policy region (block 865).

After the selected GM banks have been moved in connection with the shared global memory segmentation conversion, a determination is made as to whether the change to the policy regions is complete (block 870). In some embodiments, implementing a global memory segmentation conversion might require a large number of GM banks to be moved from one policy region to the other policy region. For example, assume that a global memory segmentation conversion requires 100 GM banks to be moved from one policy region to the other policy region. Rather than selecting all 100 GM banks at block 860 and moving all 100 GM banks at block 865, in some embodiments the process of ranking GM banks (block 850 or 855), selecting a set of one or more lowest performing GM banks (block 860), and moving a selected group of GM banks (block 865) iterates multiple times, each time moving a subset of the total number of GM banks. In the example where 100 GM banks need to be moved from one policy region to the other, in some embodiments the lowest performing 5 or 10 GM banks might initially be selected to be moved. After movement of the select group of 5 or 10 GM banks, the remaining GM banks are re-ranked and the next 5 or 10 lowest performing GM banks are selected to be moved. By iteratively moving a subset of the total number of GM banks that need to be moved to implement the shared global memory segmentation conversion, it is possible to minimize the disruption to the use of shared global memory.

Accordingly, as shown in FIG. 8, in some embodiments a determination is made as to whether the global memory adjustment engine 165 has completed the changes to the policy region sizes (block 870). In response to a determination that the changes to the policy region sizes is not complete (a determination of NO at block 870), the global memory adjustment engine 165 waits a period of time, re-ranks the remaining memory banks using either the process described in connection with block 850 or block 855 (block 875), and then selects the lowest performing GM bank or set of N lowest performing GM banks (block 860) to be moved (block 865). The process iterates until the global memory adjustment engine 165 determines that the policy region size adjustment portion of the shared global memory segmentation conversion process is complete (a determination of YES at block 870), at which time the aspects of implementation of the global memory segmentation conversion process relative to the policy region size adjustments ends (block 880).

Although FIG. 8 addresses primarily the manner in which the policy region size is adjusted, frequently a reduction in size of a given policy region will be accompanied with a reduction in size of a particular IO pool within the policy region. Preferably, the GM banks that are selected for movement from one policy region to the other are also selected from the particular IO pools within the given policy region that are also being reduced in size. For example, if a policy change requires movement of a single GM bank from the unmirrored to the mirrored policy region, and the policy change specifies that the 16 KB IO pool within the unmirrored policy region should be reduced in size, in some embodiments when the GM banks of the unmirrored policy region are ranked, only the GM banks that are being used to implement the 16 KB IO pool are ranked, and then a GM bank from within the 16 KB IO pool within the unmirrored policy region is selected to be moved to the mirrored policy region.

FIG. 9 is a flow chart of an example process of shared global memory segmentation conversion, showing a process of optimizing selection of GM banks for movement between IO pools within a given policy region, to implement a dynamic global memory segmentation policy change, according to some embodiments. The process shown in FIG. 9 can also be used to implement movement from of GM banks from an IO pool in one policy region to a destination IO pool in the other policy region. Thus, although FIGS. 8 and 9 are separately described, it should be understood that a given shared memory segmentation conversion might involve both adjustments to the policy regions and adjustments to the sizes of the IO pools within the policy regions. Accordingly, a given shared global memory segmentation conversion process might include adjustments to the sizes of the policy regions (FIG. 8), no adjustment to the size of the policy regions but adjustments to the sizes of the IO pools (FIG. 9 only), or adjustments to both the sizes of the policy regions and the sizes of the IO pools (both FIGS. 8 and 9).

As shown in FIG. 9, in some embodiments the global memory adjustment engine 165 retrieves the current memory segmentation policy (block 900). In some embodiments the current memory segmentation policy includes information specifying the size of each of the IO pools 220 within the mirrored policy region (block 905) and the size of each of the IO pools 220 within the unmirrored policy region (block 910). The global memory adjustment engine 165 also retrieves the updated global memory segmentation policy (block 915). In some embodiments the updated memory segmentation policy includes information specifying the new size of each of the IO pools 220 within the mirrored policy region (block 920) and the new size of each of the IO pools 220 within the unmirrored policy region (block 925). The global memory adjustment engine 165 then implements a comparison between the current and updated global memory segmentation policies (block 930) to determine if there are any changes that need to be made to the sizes of the IO pools within one or both of the policy regions 205, 210 (block 935).

In response to a determination that the updated global memory segmentation policy does not include any changes to the sizes of IO pools (a determination of NO at block 935) aspects of implementation of the global memory segmentation conversion process relative to the IO pool adjustments ends (block 985).

In response to a determination that the updated global memory segmentation policy does include changes to the sizes of the IO pools (a determination of YES at block 935), the global memory adjustment engine 165 identifies an IO pool that is being reduced in size, and then determines where the target IO pool resides (unmirrored or mirrored policy region) (block 940).

An IO pool that is being reduced in size will have one or more GM banks 240 that will need to be selected to be removed from the IO pool. Stated differently, to reduce the size of an IO pool, the number of GM banks allocated to the IO pool will need to be reduced. Accordingly, as described in greater detail herein, the GM banks 240 of the IO pool that is being reduced in size are ranked to select the lowest performing GM banks 240 to be removed from the IO pool. In some embodiments, the manner in which the GM banks are ranked depends on which policy region contains the IO pool that is being reduced in size.

In the example shown in FIG. 9, the global memory adjustment engine 165 determines if the IO pool that is being reduced in size resides within the mirrored policy region (block 945). Equivalently, the global memory adjustment engine 165 could also determine if the IO pool that is being reduced in size resides within the unmirrored policy region. In response to a determination that the IO pool that is being reduced in size resides within the mirrored policy region (a determination of YES at block 945), the global memory adjustment engine 165 ranks the memory banks of the IO pool based on a combination of Fall Through Time (FTT) and ageing of the GM banks (block 950). In response to a determination that the IO pool that is being reduced in size resides within the unmirrored policy region (a determination of NO at block 945), the global memory adjustment engine 165 ranks the memory banks of the IO pool based on the Fall Through Time (FTT) of the GM banks (block 955).

Regardless of how the GM banks are ranked (block 950 or block 955), after the GM banks of the IO pool that is being reduced in size are ranked, the global memory adjustment engine 165 selects a lowest performing GM bank or a set of N lowest performing memory banks (block 960) and removes the selected memory GM banks from the IO pool (block 965). The removed GM banks may then be assigned to a different IO pool within the given policy region, or may be moved to the other policy region and assigned to an IO pool within the other policy region.

After the selected GM banks have been removed from the IO pool in connection with the shared global memory segmentation conversion, a determination is made as to whether there are additional IO pools that are being reduced in size (block 970). If there are additional IO pools that are being reduced in size (a determination of YES at block 970) the process returns to block 940 where a subsequent IO pool is processed using the steps described in blocks 945-965.

In response to a determination that there are no additional IO pools that are being reduced in size (a determination of NO at block 970), a determination is made as to whether the changes to the IO pools is complete (block 975). In some embodiments, implementing a global memory segmentation conversion might require a large number of GM banks to be moved between IO pools. For example, assume that a global memory segmentation conversion requires 100 GM banks to be moved between IO pools within the policy regions. Rather than moving all 100 GM banks at once, in some embodiments the process of ranking GM banks (block 950 or 955), selecting lowest performing GM banks (block 960), and moving a selected group of GM banks (block 965) iterates multiple times, each time moving a subset of the total number of GM banks. By iteratively moving a subset of the total number of GM banks that need to be moved to implement the shared global memory segmentation conversion, it is possible to minimize the disruption to the use of shared global memory.

Accordingly, as shown in FIG. 9, in some embodiments a determination is made as to whether the global memory adjustment engine 165 has completed the changes to the sizes of the IO pools (block 975). In response to a determination that the changes to the sizes of the IO pools is not complete (a determination of NO at block 975), the global memory adjustment engine 165 waits a period of time, re-ranks the memory banks using either the process described in connection with block 950 or block 955 (block 980), and then selects the lowest performing GM bank or set of lowest performing GM banks (block 960) to be moved (block 965). The process iterates until the global memory adjustment engine 165 determines that the sizes of the IO pools have been adjusted to meet the requirements of the updated global memory segmentation policy (a determination of YES at block 975), at which time the aspects of implementation of the global memory segmentation conversion process relative to the adjustment of the sizes of the IO pools ends (block 985).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of conversion of global memory segmentation, comprising:
   applying a global memory segmentation policy to a global memory, the global memory comprising a plurality of global memory banks, each global memory bank being a chunk of the global memory of fixed size, including a plurality of slots of the shared global memory, and representing a minimum granularity for implementation of the shared global memory segmentation policy on the global memory, the global memory segmentation policy specifying a first size of a first mirrored policy region to be implemented by assigning a first number of the GM banks to the first mirrored policy region, and the global memory segmentation policy specifying a second size of a second unmirrored policy region to be implemented by assigning a second number of the GM banks to the second unmirrored policy region;
   receiving a new global memory segmentation policy to be applied to the global memory, the new global memory segmentation policy specifying a new size of the first mirrored policy region to be implemented by assigning a new first number of GM banks to the first mirrored policy region, and the global memory segmentation policy specifying a new size of the second unmirrored policy region to be implemented by assigning a new second number of GM banks to the second mirrored policy region; and
   determining if the new global memory segmentation policy requires the first mirrored policy region to be reduced in size or if the new global memory segmentation policy requires the second unmirrored policy region to be reduced in size;
   in response to a determination that the first mirrored policy region is being reduced in size, ranking GM banks of the first number of GM banks of the first mirrored policy region according to performance of the respective GM banks based on use of data contained in the respective sets of slots of the respective GM banks, and selecting a subset of the first number of GM banks of the first mirrored policy region to be added to the second number of GM banks of the second unmirrored policy region; and
   in response to a determination that the second unmirrored policy region is being reduced in size, ranking the second number of GM banks of the second unmirrored policy region according to performance of the respective GM banks based on use of data contained in the respective sets of slots of the respective GM banks, and selecting a subset of the second number of GM banks of the second unmirrored policy region to be added to the first number of GM banks of the first mirrored policy region.

2. The method of claim 1, wherein ranking the second number of GM banks of the second unmirrored policy region according to performance of the respective GM banks comprises ranking the second number of GM banks according to fall through time of the GM banks, the fall through time being calculated as an average amount of time it takes for a piece of data to be evicted from the GM bank after being added to one of the slots of the GM bank.

3. The method of claim 2, wherein ranking the first number of GM banks of the first mirrored policy region according to performance of the respective GM banks comprises ranking the first number of GM banks according to a combination of ageing and fall through time of the GM banks, the aging being calculated as an average amount of time data is stored in the slots of a given GM bank prior to being destaged to back-end storage resources.

4. The method of claim 1, wherein selecting the subset of the first number of GM banks of the first mirrored policy region to be added to the second number of GM banks of the second unmirrored policy region comprises:
   initially selecting a group of fewer than a total number of the subset of the first number of GM banks for movement;
   re-ranking remaining GM banks of the first mirrored policy region;
   selecting another group of fewer than the total number of the subset of the first number of GM banks for movement; and
   iterating the process of re-ranking the remaining GM banks and selecting another group of fewer than the total number of the subset until the total number of the subset of the first number of GM banks has been selected.

5. The method of claim 1, wherein selecting the subset of the second number of GM banks of the second mirrored policy region to be added to the first number of GM banks of the first unmirrored policy region comprises:
   initially selecting a group of fewer than a total number of the subset of the second number of GM banks for movement;
   re-ranking remaining GM banks of the second mirrored policy region;
   selecting another group of fewer than the total number of the subset of the second number of GM banks for movement; and
   iterating the process of re-ranking the remaining GM banks and selecting another group of fewer than the total number of the subset until the total number of the subset of the second number of GM banks has been selected.

6. The method of claim 1, wherein the global memory segmentation policy further specifies sizes of a first plurality of IO pools within the first mirrored policy region and sizes of a second plurality of IO pools within the second unmirrored policy region; and
   wherein the new global memory segmentation policy further specifies new sizes of the first plurality of IO pools within the first mirrored policy region and new sizes of the second plurality of IO pools within the second unmirrored policy region.

7. A system for conversion of global memory segmentation, comprising:
   one or more processors and one or more storage devices storing instructions that are operable, when executed by the one or more processors, to cause the one or more processors to perform operations comprising:
   applying a global memory segmentation policy to a global memory, the global memory comprising a plurality of global memory banks, each global memory bank being a chunk of the global memory of fixed size, including a plurality of slots of the shared global memory, and representing a minimum granularity for implementation of the shared global memory segmentation policy on the global memory, the global memory segmentation policy specifying a first size of a first mirrored policy region to be implemented by assigning a first number of the GM banks to the first mirrored policy region, and the global memory segmentation policy specifying a second size of a second unmirrored policy region to be implemented by assigning a second number of the GM banks to the second unmirrored policy region;

receiving a new global memory segmentation policy to be applied to the global memory, the new global memory segmentation policy specifying a new size of the first mirrored policy region to be implemented by assigning a new first number of GM banks to the first mirrored policy region, and the global memory segmentation policy specifying a new size of the second unmirrored policy region to be implemented by assigning a new second number of GM banks to the second mirrored policy region; and determining if the new global memory segmentation policy requires the first mirrored policy region to be reduced in size or if the new global memory segmentation policy requires the second unmirrored policy region to be reduced in size;

in response to a determination that the first mirrored policy region is being reduced in size, ranking GM banks of the first number of GM banks of the first mirrored policy region according to performance of the respective GM banks based on use of data contained in the respective sets of slots of the respective GM banks, and selecting a subset of the first number of GM banks of the first mirrored policy region to be added to the second number of GM banks of the second unmirrored policy region; and in response to a determination that the second unmirrored policy region is being reduced in size, ranking the second number of GM banks of the second unmirrored policy region according to performance of the respective GM banks based on use of data contained in the respective sets of slots of the respective GM banks, and selecting a subset of the second number of GM banks of the second unmirrored policy region to be added to the first number of GM banks of the first mirrored policy region.

8. The system of claim 7, wherein ranking the second number of GM banks of the second unmirrored policy region according to performance of the respective GM banks comprises ranking the second number of GM banks according to fall through time of the GM banks, the fall through time being calculated as an average amount of time it takes for a piece of data to be evicted from the GM bank after being added to one of the slots of the GM bank.

9. The system of claim 8, wherein ranking the first number of GM banks of the first mirrored policy region according to performance of the respective GM banks comprises ranking the first number of GM banks according to a combination of ageing and fall through time of the GM banks, the aging being calculated as an average amount of time data is stored in the slots of a given GM bank prior to being destaged to back-end storage resources.

10. The system of claim 7, wherein selecting the subset of the first number of GM banks of the first mirrored policy region to be added to the second number of GM banks of the second unmirrored policy region comprises:

initially selecting a group of fewer than a total number of the subset of the first number of GM banks for movement;

re-ranking remaining GM banks of the first mirrored policy region;

selecting another group of fewer than the total number of the subset of the first number of GM banks for movement; and iterating the process of re-ranking the remaining GM banks and selecting another group of fewer than the total number of the subset until the total number of the subset of the first number of GM banks has been selected.

11. The system of claim 7, wherein selecting the subset of the second number of GM banks of the second mirrored policy region to be added to the first number of GM banks of the first unmirrored policy region comprises:

initially selecting a group of fewer than a total number of the subset of the second number of GM banks for movement;

re-ranking remaining GM banks of the second mirrored policy region;

selecting another group of fewer than the total number of the subset of the second number of GM banks for movement; and iterating the process of re-ranking the remaining GM banks and selecting another group of fewer than the total number of the subset until the total number of the subset of the second number of GM banks has been selected.

12. The system of claim 7, wherein the global memory segmentation policy further specifies sizes of a first plurality of IO pools within the first mirrored policy region and sizes of a second plurality of IO pools within the second unmirrored policy region; and wherein the new global memory segmentation policy further specifies new sizes of the first plurality of IO pools within the first mirrored policy region and new sizes of the second plurality of IO pools within the second unmirrored policy region.

13. The system of claim 12, the operations further comprising:

determining if the new global memory segmentation policy requires an IO pool to be reduced in size;

in response to a determination that an IO pool is required to be reduced in size, determining if the IO pool that is being reduced in size is within the first mirrored policy region or within the second unmirrored policy region;

in response to a determination that the IO pool that is required to be reduced in size is within the first mirrored policy region, ranking GM banks of the IO pool that is required to be reduced in size according to a first performance criteria, and selecting a subset of the GM banks of the IO pool that is required to be reduced in size to be moved to an IO pool that is being increased in size; and in response to a determination that the IO pool that is required to be reduced in size is within the second unmirrored policy region, ranking GM banks of the IO pool that is required to be reduced in size according to a second performance criteria, different from the first performance criteria, and selecting a subset of the GM banks of the IO pool that is required to be reduced in size to be moved to the IO pool that is being increased in size.

14. The system of claim 13, wherein the first performance criteria comprises a combination of ageing and fall through time of the GM banks of the IO pool that is required to be reduced in size; and wherein the second performance criteria comprises the fall through time of the GM banks of the IO pool that is required to be reduced in size.

15. The system of claim 14, wherein the first mirrored policy region is used to store data received from hosts in connection with host write operations, and wherein ageing identifies an average amount of time data is stored in a given GM bank prior to being destaged to back-end storage resources.

16. The system of claim 14, wherein the second unmirrored policy region is used to store data to be provided to hosts in connection with host read operations, and wherein fall through time identifies an average amount of time it takes for a piece of data to be evicted from a given GM bank when data contained within the GM bank is managed using a virtual First In First Out (FIFO) queue.

17. A method of conversion of global memory segmentation, comprising:
applying a global memory segmentation policy to a global memory, the global memory comprising a plurality of global memory banks, the global memory segmentation policy specifying a first size of a first mirrored policy region to be implemented by assigning a first plurality of GM banks to the first mirrored policy region, and the global memory segmentation policy specifying a second size of a second unmirrored policy region to be implemented by assigning a second plurality of GM banks to the second unmirrored policy region;
receiving a new global memory segmentation policy to be applied to the global memory, the new global memory segmentation policy specifying a new size of the first mirrored policy region to be implemented by assigning a new first plurality of GM banks to the first mirrored policy region, and the global memory segmentation policy specifying a new size of the second unmirrored policy region to be implemented by assigning a new second plurality of GM banks to the second mirrored policy region; and
determining if the new global memory segmentation policy requires the first mirrored policy region to be reduced in size or if the new global memory segmentation policy requires the second unmirrored policy region to be reduced in size;
in response to a determination that the first mirrored policy region is being reduced in size, ranking the first plurality of GM banks of the first mirrored policy region according to performance, and selecting a subset of the first plurality of GM banks of the first mirrored policy region to be added to the second plurality of GM banks of the second unmirrored policy region; and
in response to a determination that the second unmirrored policy region is being reduced in size, ranking the second plurality of GM banks of the second unmirrored policy region according to performance, and selecting a subset of the second plurality of GM banks of the second unmirrored policy region to be added to the first plurality of GM banks of the first mirrored policy region;
wherein the global memory segmentation policy further specifies sizes of a first plurality of IO pools within the first mirrored policy region and sizes of a second plurality of IO pools within the second unmirrored policy region; and
wherein the new global memory segmentation policy further specifies new sizes of the first plurality of IO pools within the first mirrored policy region and new sizes of the second plurality of IO pools within the second unmirrored policy region;
the method further comprising:
determining if the new global memory segmentation policy requires an IO pool to be reduced in size;
in response to a determination that an IO pool is required to be reduced in size, determining if the IO pool that is being reduced in size is within the first mirrored policy region or within the second unmirrored policy region;
in response to a determination that the IO pool that is required to be reduced in size is within the first mirrored policy region, ranking GM banks of the IO pool that is required to be reduced in size according to a first performance criteria, and selecting a subset of the GM banks of the IO pool that is required to be reduced in size to be moved to an IO pool that is being increased in size; and
in response to a determination that the IO pool that is required to be reduced in size is within the second unmirrored policy region, ranking GM banks of the IO pool that is required to be reduced in size according to a second performance criteria, different from the first performance criteria, and selecting a subset of the GM banks of the IO pool that is required to be reduced in size to be moved to the IO pool that is being increased in size.

18. The method of claim 17, wherein the first performance criteria comprises a combination of ageing and fall through time of the GM banks of the IO pool that is required to be reduced in size; and
wherein the second performance criteria comprises the fall through time of the GM banks of the IO pool that is required to be reduced in size.

19. The method of claim 18, wherein the first mirrored policy region is used to store data received from hosts in connection with host write operations, and wherein ageing identifies an average amount of time data is stored in a given GM bank prior to being destaged to back-end storage resources.

20. The method of claim 18, wherein the second unmirrored policy region is used to store data to be provided to hosts in connection with host read operations, and wherein fall through time identifies an average amount of time it takes for a piece of data to be evicted from a given GM bank when data contained within the GM bank is managed using a virtual First In First Out (FIFO) queue.

* * * * *